(12) United States Patent
Konda et al.

(10) Patent No.: US 7,336,671 B2
(45) Date of Patent: Feb. 26, 2008

(54) NETWORK RELAY APPARATUS AND NETWORK RELAY METHOD

(75) Inventors: Kazunobu Konda, Tokyo (JP); Hideki Ohkita, Fuchu (JP); Ken Matsushita, Tama (JP); Hiroaki Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 931 days.

(21) Appl. No.: 10/635,459

(22) Filed: Aug. 7, 2003

(65) Prior Publication Data
US 2004/0098751 A1 May 20, 2004

(30) Foreign Application Priority Data
Aug. 9, 2002 (JP) ............................. 2002-233030

(51) Int. Cl.
*H04L 12/28* (2006.01)
(52) U.S. Cl. .................................................... 370/402
(58) Field of Classification Search ........ 370/400–406, 370/464–467; 709/249, 250; 710/311–315
See application file for complete search history.

(56) References Cited

U.S. PATENT DOCUMENTS

| | | | | |
|---|---|---|---|---|
| 5,754,548 A * | 5/1998 | Hoekstra et al. | ............ | 370/402 |
| 6,219,697 B1 * | 4/2001 | Lawande et al. | ............ | 709/221 |
| 6,523,696 B1 * | 2/2003 | Saito et al. | .................. | 709/223 |
| 6,591,419 B2 * | 7/2003 | Barry et al. | .................. | 725/25 |
| 6,601,127 B1 * | 7/2003 | Nomura et al. | ............. | 710/306 |
| 6,925,518 B2 * | 8/2005 | Rudland et al. | ............. | 710/313 |
| 2002/0087964 A1 * | 7/2002 | Sullivan | ...................... | 717/174 |

FOREIGN PATENT DOCUMENTS

| | | |
|---|---|---|
| JP | 2000-174797 | 6/2000 |
| JP | 2001-7836 | 1/2001 |
| JP | WO 02/37750 A2 | 5/2002 |

OTHER PUBLICATIONS

Japanese Office Action, dated Aug. 31, 2004 for Patent Application No. 2002-233030.
"P1212 Draft Standard for a Control and Status Registers (CSR) Architecture for microcomputer buses," IEEE, p. 1212 Draft 1.0, Oct. 18, 1999.
"Information technology—Microprocessor systems—Control and Status Registers (CSR) Architecture for micocomputer buses," IEEE, ISO/IEC 13213: 1994 [ANSI/IEEE Std 1212, 1994 Edition].
"TA Document 2001012 AV/C Digital Interface Command Set General Specification Version 4.1," 1394 Trade Association, Dec. 11, 2001.
"IEC 61883-1: Consumer audio/video equipment—Digital interface—Part 1: General," 100C/182 Final Draft International Standard (FDIS).

* cited by examiner

*Primary Examiner*—Dmitry Levitan
(74) *Attorney, Agent, or Firm*—Pillsbury Winthrop Shaw Pittman, LLP

(57) ABSTRACT

This invention provides a network relay apparatus has an information collecting portion for collecting information about the function and identification of devices V1-V4 in other network n1 through a communication channel N, a virtual unit generating portion for generating virtual unit information corresponding to a first protocol based on the collected device information, and a relay portion which receives a predetermined command from the first network and which transmits the predetermined command to the device in the second network based on the virtual unit information. Consequently, control of apparatuses among networks is facilitated.

11 Claims, 9 Drawing Sheets

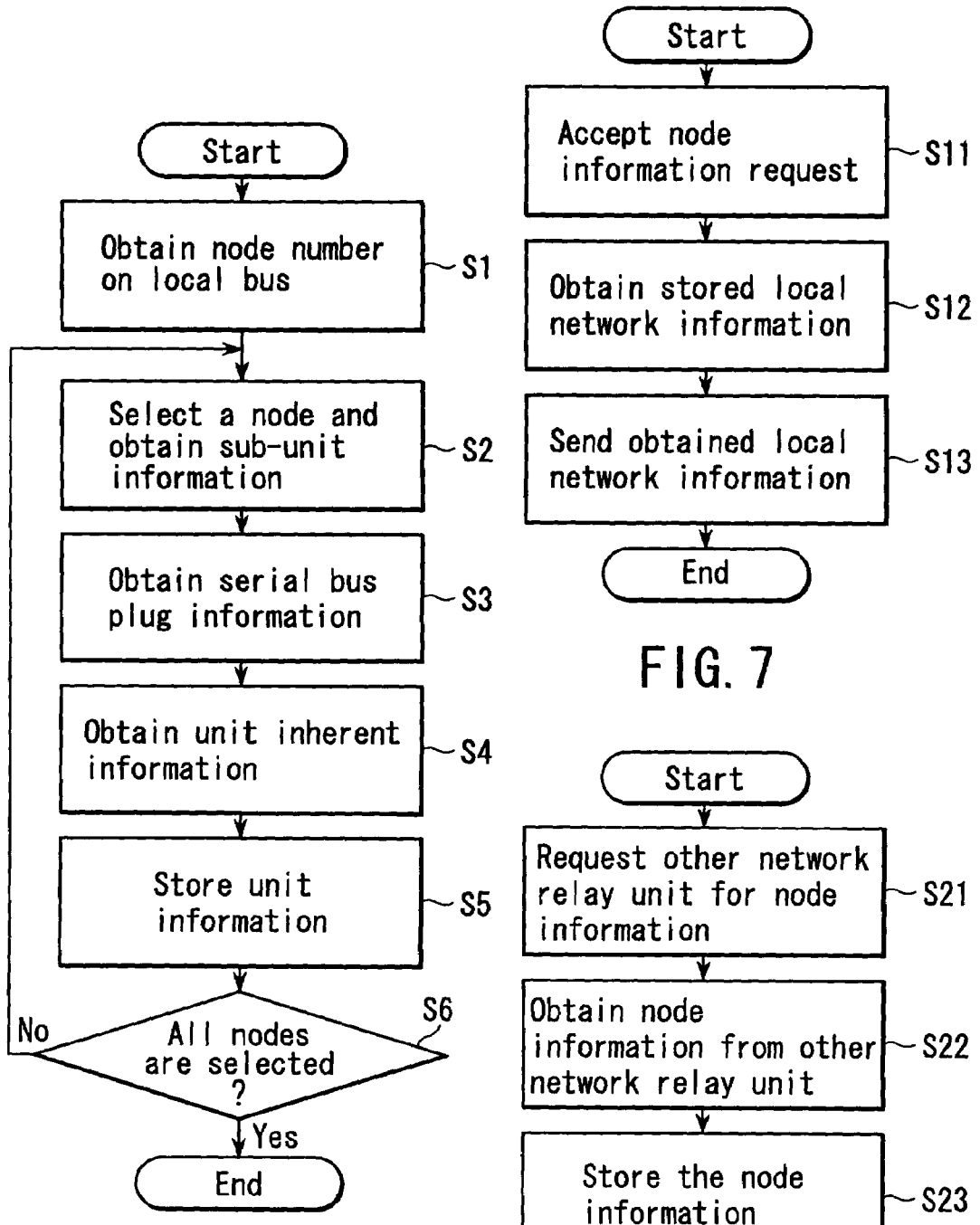

NETWORK RELAY APPARATUS AND NETWORK RELAY METHOD

CROSS-REFERENCE TO RELATED APPLICATIONS

This application is based upon and claims the benefit of priority from the prior Japanese Patent Application No. 2002-233030, filed Aug. 9, 2002, the entire contents of which are incorporated herein by reference.

BACKGROUND OF THE INVENTION

1. Field of the Invention

The present invention relates to a network relay apparatus and method for relaying multiple networks and more particularly to a network relay apparatus and method for controlling different network apparatuses mutually.

2. Description of the Related Art

In recent years, with prevailing of various kinds of digital apparatuses, network communication technology among the digital apparatuses has been demanded to raise its reliability and diversify its function. As one of communication technologies for a network constituted of such multiple audio visual apparatuses, IEEE1394 standard is available. In a network constructed of the IEEE1394 serial bus, respective audio visual apparatuses use allocated address spaces each having fixed 64 bits specified according to IEEE1212CSR (control and status register architecture). Further, the IEEE1394 defines read transaction, write transaction and lock transaction requested by the IEEE1212CSR.

Further, as a standard used for realizing control state and controlled state among the respective AV apparatuses, AV/C digital interface command set (hereinafter referred to as AV/C command) specified by 1394TA (1394 trade association) is available. The AV/C command realizes control and state acquisition of other apparatus through write transaction using function control protocol (FCP) specified by the IEC61883. Under the AV/C command standard, AV/C unit model and AV/C sub-unit model are defined as a model which logically expresses the function of the AV apparatus. The AV/C sub-unit model is a model expressing the function of a device loaded in an AV apparatus, and, for example, tuner unit, monitor sub-unit, VTR sub-unit, disc sub-unit and the like are defined. The AV/C unit model is a logical model expressing the AV apparatus and capable of possessing one or multiple AV/C sub-unit units. The AV/C unit and the AV/C sub-unit have a logical interface called plug as an interface with outside, respectively. By transmitting this AV/C command to the AV/C unit or the AV/C sub-unit, this AV apparatus can be controlled or its information can be obtained.

On the other hand, in order to send/receive AV stream between the apparatuses through the IEEE1394 serial bus, write and read are carried out to the plug control register (PCR) defined by the IEC61883 using read transaction and lock transaction based on connection management procedure (CMP) specified by the IEC61883, thereby establishing logical connection (hereinafter referred to as connection).

Upon communication based on such a network standard, if an apparatus existing on one network intends to access and control another apparatus existing on other network when multiple networks exist independently, data is transmitted through a bus bridge connecting between the networks. Then, to carry out such data transmission between networks, software and hardware meeting the bus bridge are necessary, so that its required system is expanded in terms of scale.

Further, because the status of an apparatus on one network cannot be known directly from the other network, the apparatus on a different network cannot be controlled easily as a different apparatus on the same network.

That is, in the conventional system, if multiple independent networks exist, the status of an apparatus on one network cannot be known from the other network easily. Therefore, an apparatus existing on a different network cannot be monitored or controlled like an apparatus existing on the same network easily.

BRIEF SUMMARY OF THE INVENTION

According to an aspect of the present invention, there is provided a network relay apparatus which is capable of being connected to a first network performing communication based on a first protocol and further connected to a second network performing communication based on a second protocol different from the first protocol, comprises an information collecting portion which collects information about the function and identification of a device in the second network; a virtual unit generating portion which generates virtual unit information corresponding to the first protocol based on the information about the function and identification of the device; and a relay portion which receives a predetermined command from the first network and which transmits the predetermined command to the device in the second network based on the virtual unit information.

BRIEF DESCRIPTION OF THE SEVERAL VIEWS OF THE DRAWING

FIG. 6 is a flow chart for explaining an operation of the self network node information collecting portion in the network relay apparatus of the present invention;

FIG. 7 is a flow chart for explaining other operation of the self network node information collecting portion in the network relay apparatus of the present invention;

FIG. 8 is a flow chart for explaining an operation of other network node information collecting portion in the network relay apparatus of the present invention;

DETAILED DESCRIPTION OF THE INVENTION

Hereinafter, the network relay apparatus of an embodiment and a network system using the same will be described in detail with reference to the accompanying drawings.

<Network System>

Figure 1:
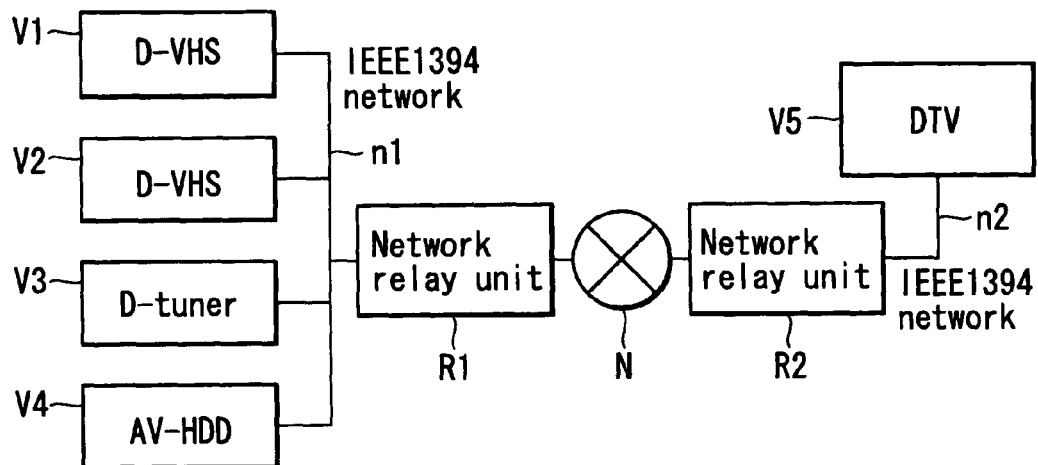
FIG. 1 is a block diagram showing the configuration of an example of a network constituted of the network relay apparatuses of the present invention.
Figure 2:
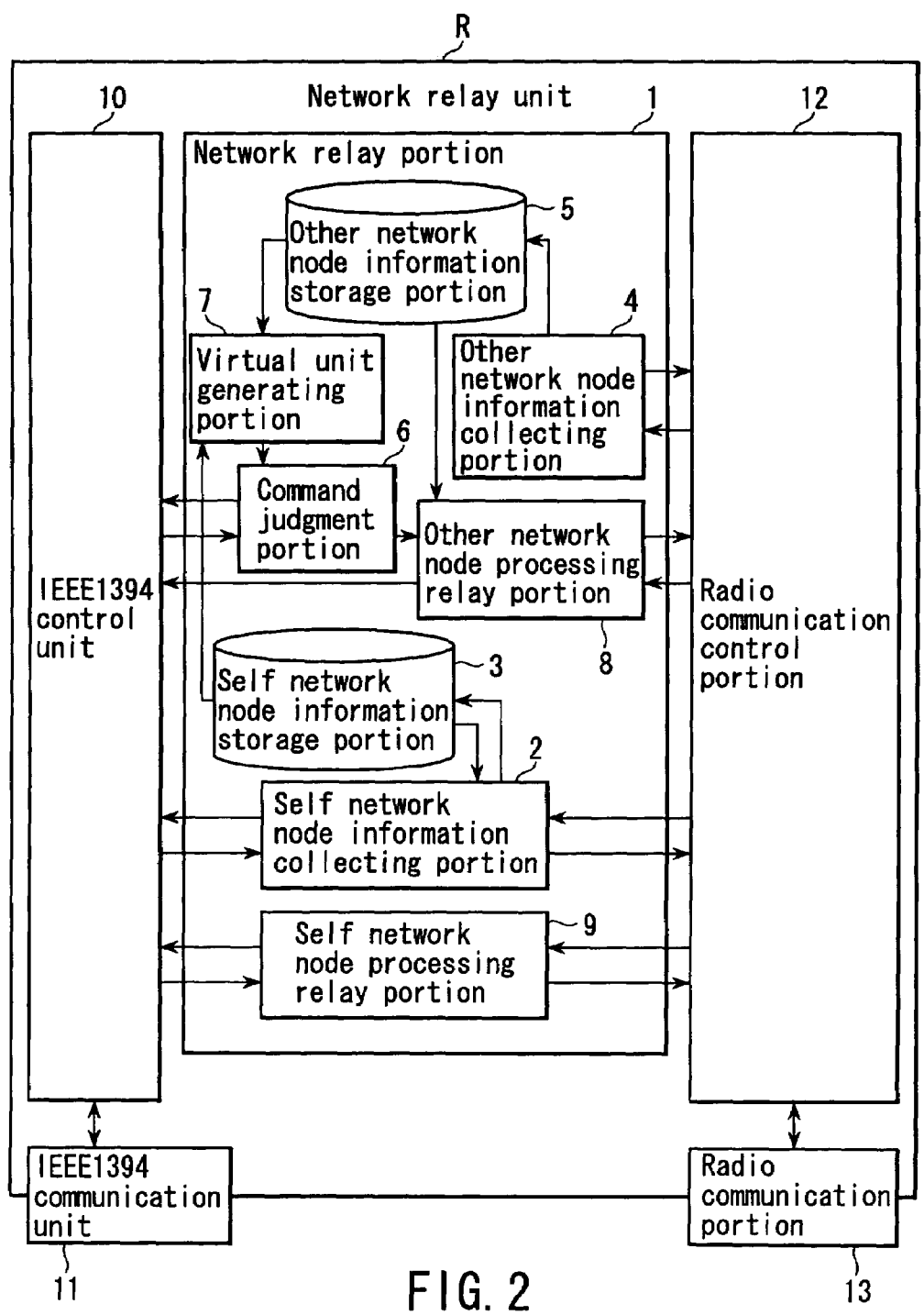
FIG. 2 is a block diagram showing an example of the configuration of the network relay apparatus of the present invention.

The network relay apparatus of the present invention and the network system using the same one relay among multiple different networks, so that respective apparatuses on each network can be accessed and controlled as if those multiple independent networks are located a single network. FIG. 1 is a block diagram showing an example of the configuration of a network system constructed with the network relay apparatus of the present invention and FIG. 2 is a block diagram showing an example of the configuration of the network relay apparatus of the invention.

Referring to FIG. 1, the network system employing the network relay apparatus of the present invention has IEEE1394 network n1 and IEEE1394 network n2 provided independently and both are provided with network relay apparatuses R1, R2 respectively. Further, the IEEE1394 networks n1, n2 are connected to each other through the network serving as a communication channel N via the network relay apparatuses R1, R2. This communication channel N may be of a communication channel formed of radio LAN, internet or other communication means.

Here, as an example, the IEEE1394 network n1 has vender V1, which is a digital VHS, vender V2, which is a digital VHS, vender V3, which is a digital tuner and vender V4, which is audio video (AV)—hard disc drive (HDD). The IEEE1394 network n2 has vender V5, which is digital television (TV). Communication protocol of the networks n1, n2 is not restricted to the IEEE1394, however may be, for example, TCP/IP or the like.

<Network Relay Apparatus>

The network relay apparatuses R1, R2 of the present invention has the configuration shown in FIG. 2, as an example and has a network relay portion 1, an IEEE1394 control portion 10 which is connected to this and realizes transaction layer, serial bus management layer and link layer based on IEEE1394 standard, an IEEE1394 communication portion 11 which is connected thereto and realizes a physical layer and connector based on the IEEE1394 standard. It further has a radio communication control portion 12 which is connected to the network relay portion 1 and a radio communication portion 13 which is connected thereto and executes radio communication through an antenna.

The network relay portion 1 has a self network node information collecting portion 2, which is connected to the IEEE1394 control portion 10 and the radio communication control portion 12 for controlling radio communication respectively, a self network node processing relay portion 9 and a self network node information storage portion 3 which is connected to the self network node information collecting portion 2. It further has an other network node processing relay portion 8, which is connected to the IEEE1394 control portion 10 and the radio communication control portion 12 respectively, an other network node information collecting portion 4, which is connected to the radio communication control portion 12 and an other network node information storage portion 5, which is connected thereto.

The network relay portion 1 further has a virtual unit generating portion 7 which receives a collection signal from the other network node information storage portion 5 and the self network node information storage portion 3 and generates virtual unit information and a command judgment portion 6 which receives an output from this portion and this output is supplied to the IEEE1394 control portion 10 and the other network node processing relay portion 8.

<Operation of Network Relay Apparatus>

Figure 4:
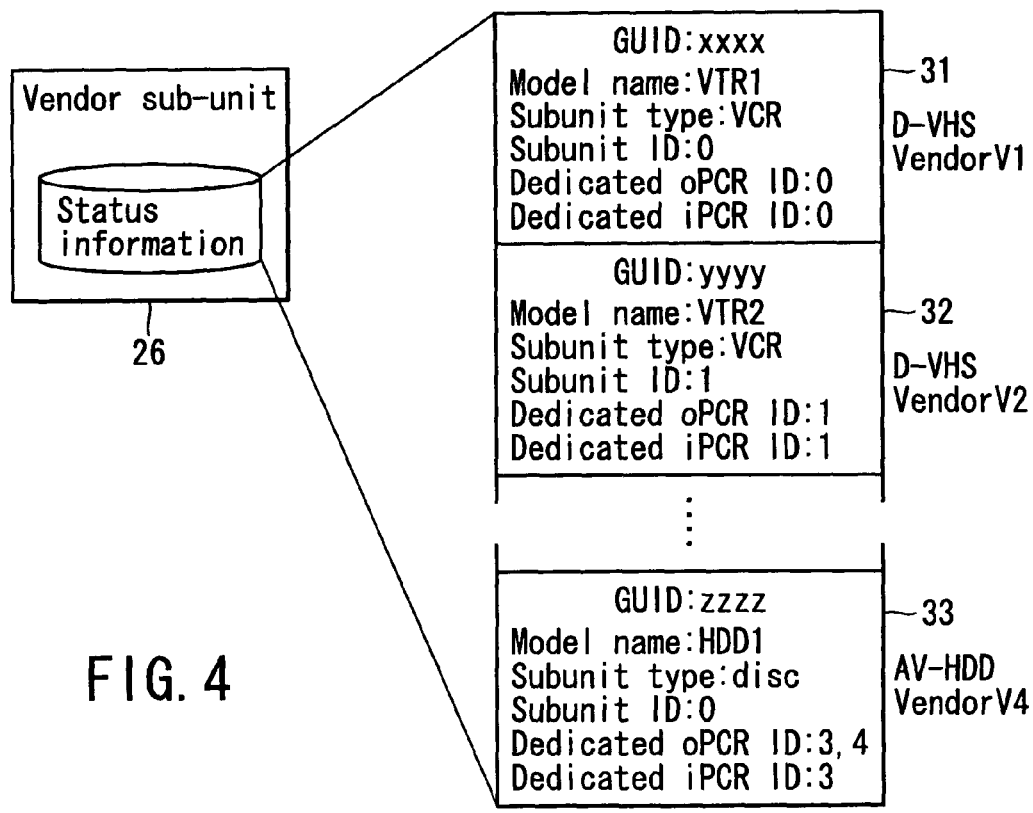
FIG. 4 is a schematic diagram showing an example of status information in the network relay apparatus of the present invention.
Figure 3:
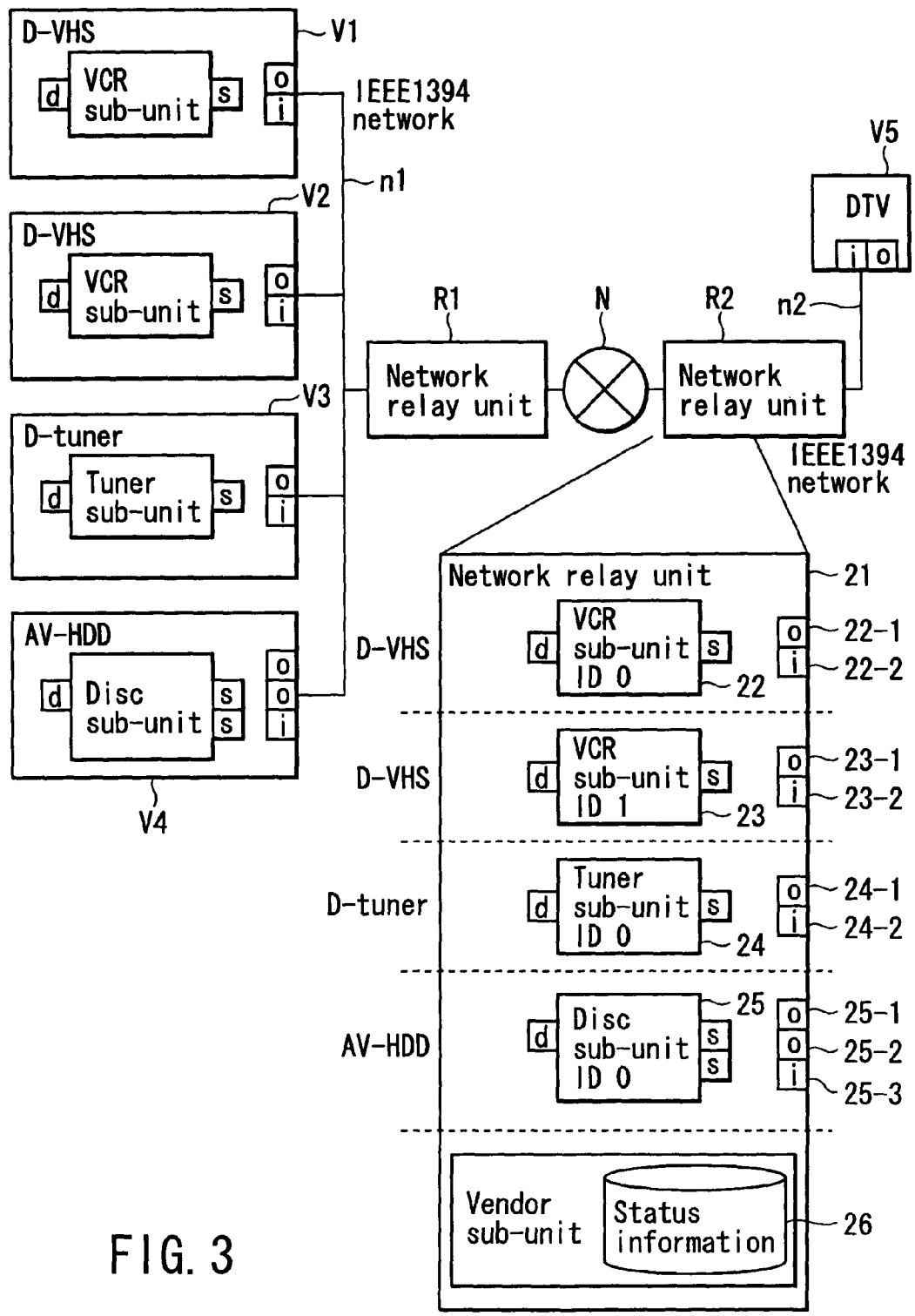
FIG. 3 is a conceptual diagram showing an example of virtual unit generated by the network relay apparatus of the present invention.
Figure 5:
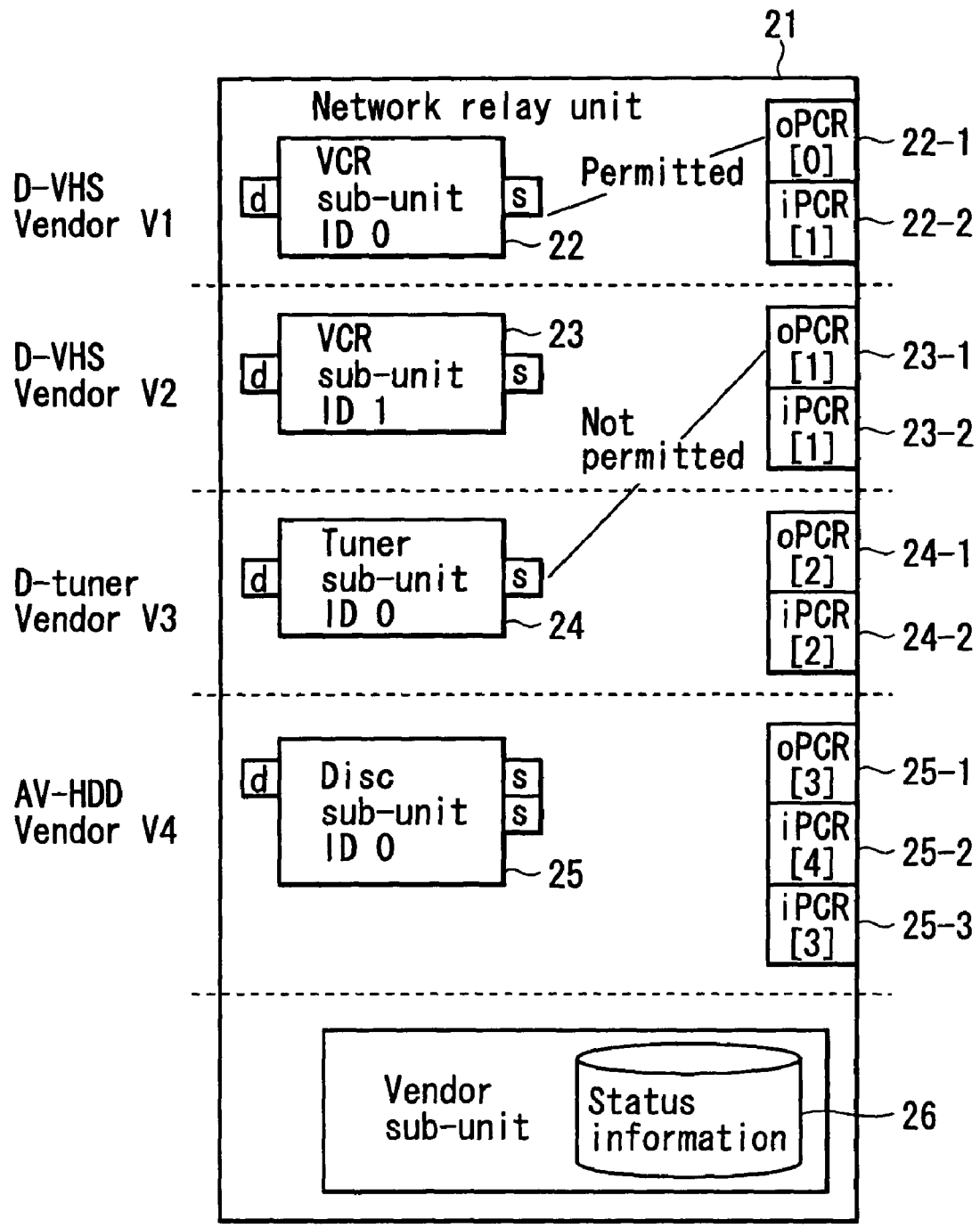
FIG. 5 is a diagram showing an example of judgment of a command judgment portion in the network relay apparatus of the present invention.
Figure 9:
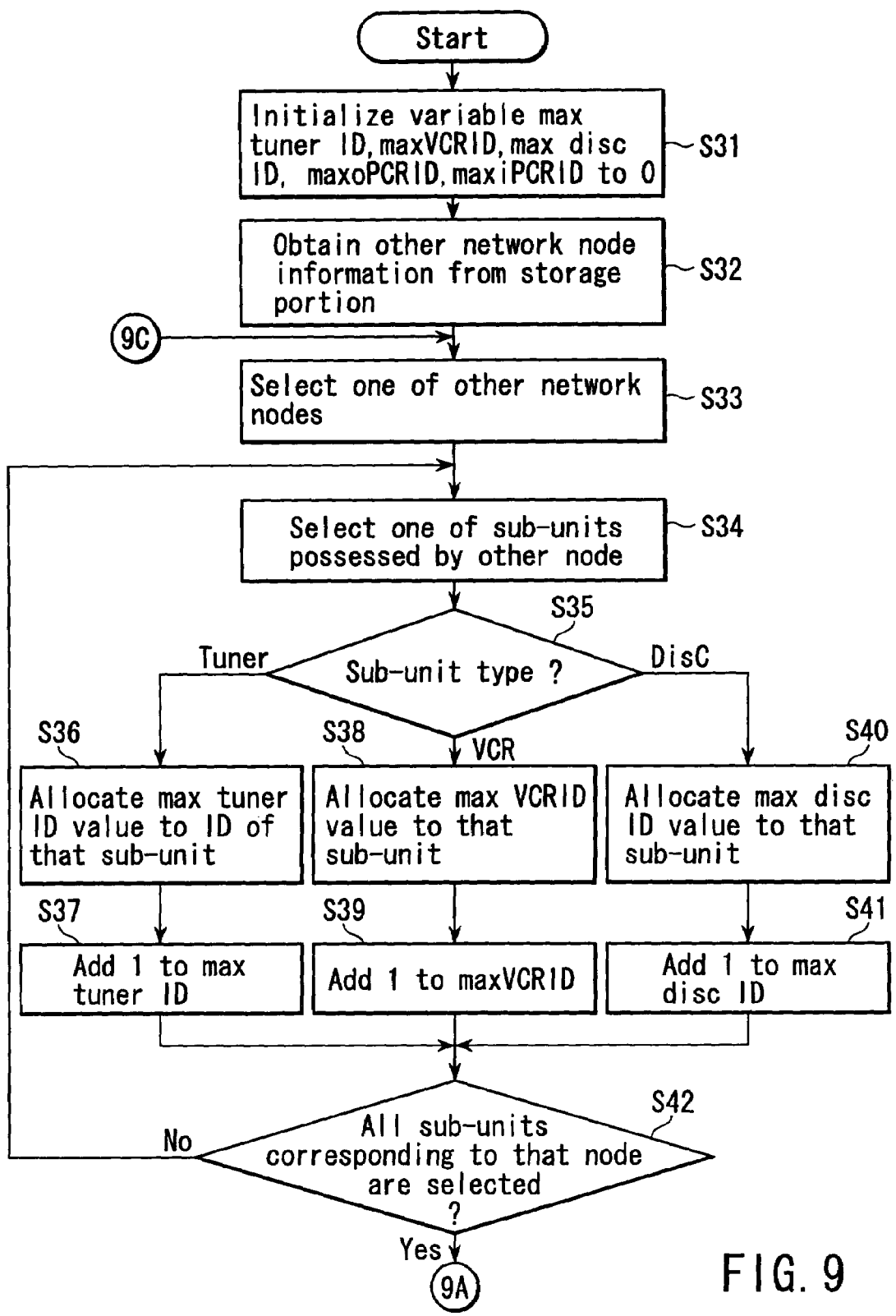
FIG. 9 is a flow chart for explaining an operation of virtual unit generating portion in the network relay apparatus of the present invention.
Figure 10:
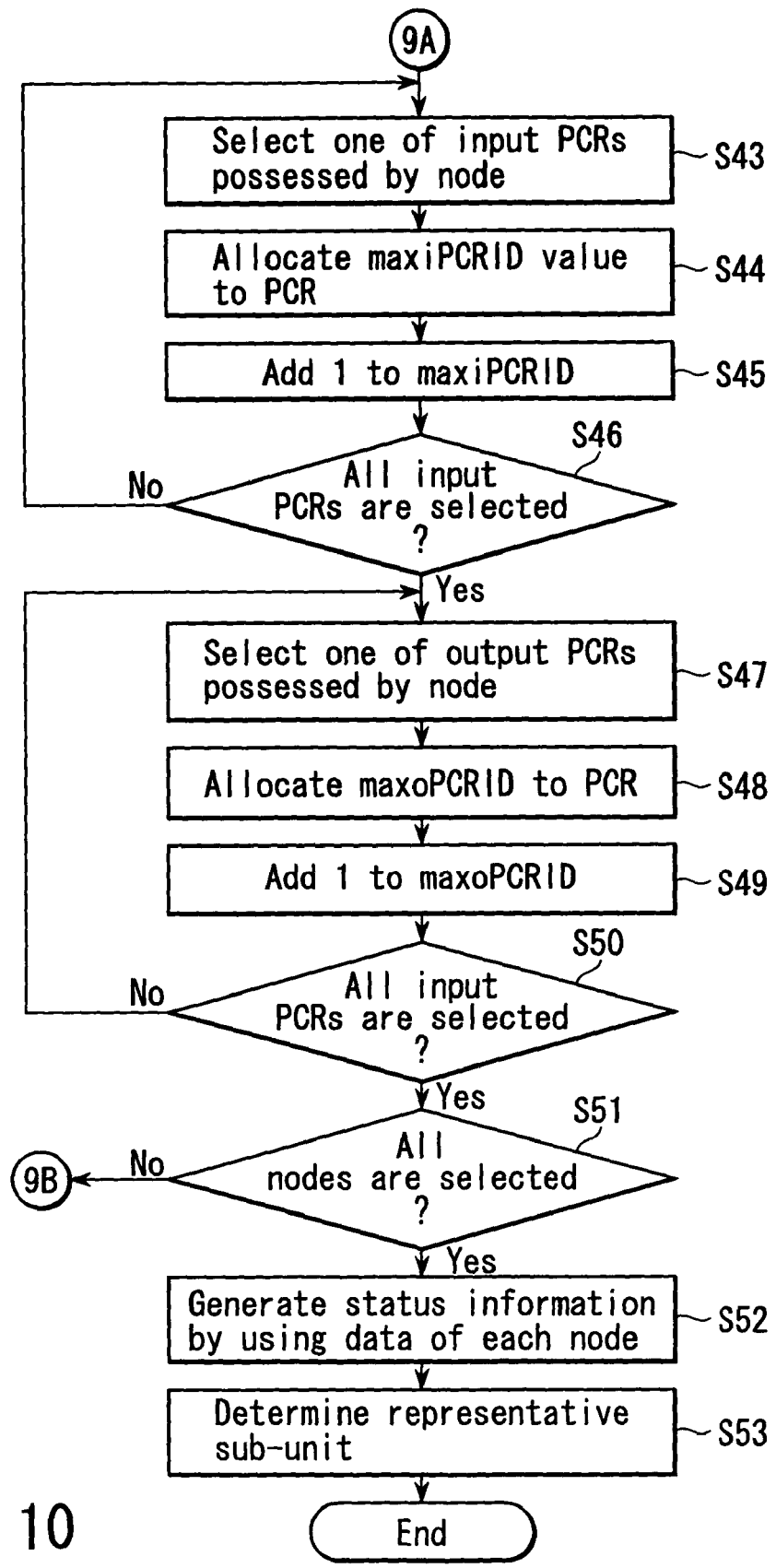
FIG. 10 is a flow chart for explaining an operation of the virtual unit generating portion in the network relay apparatus of the present invention.
Figure 11:
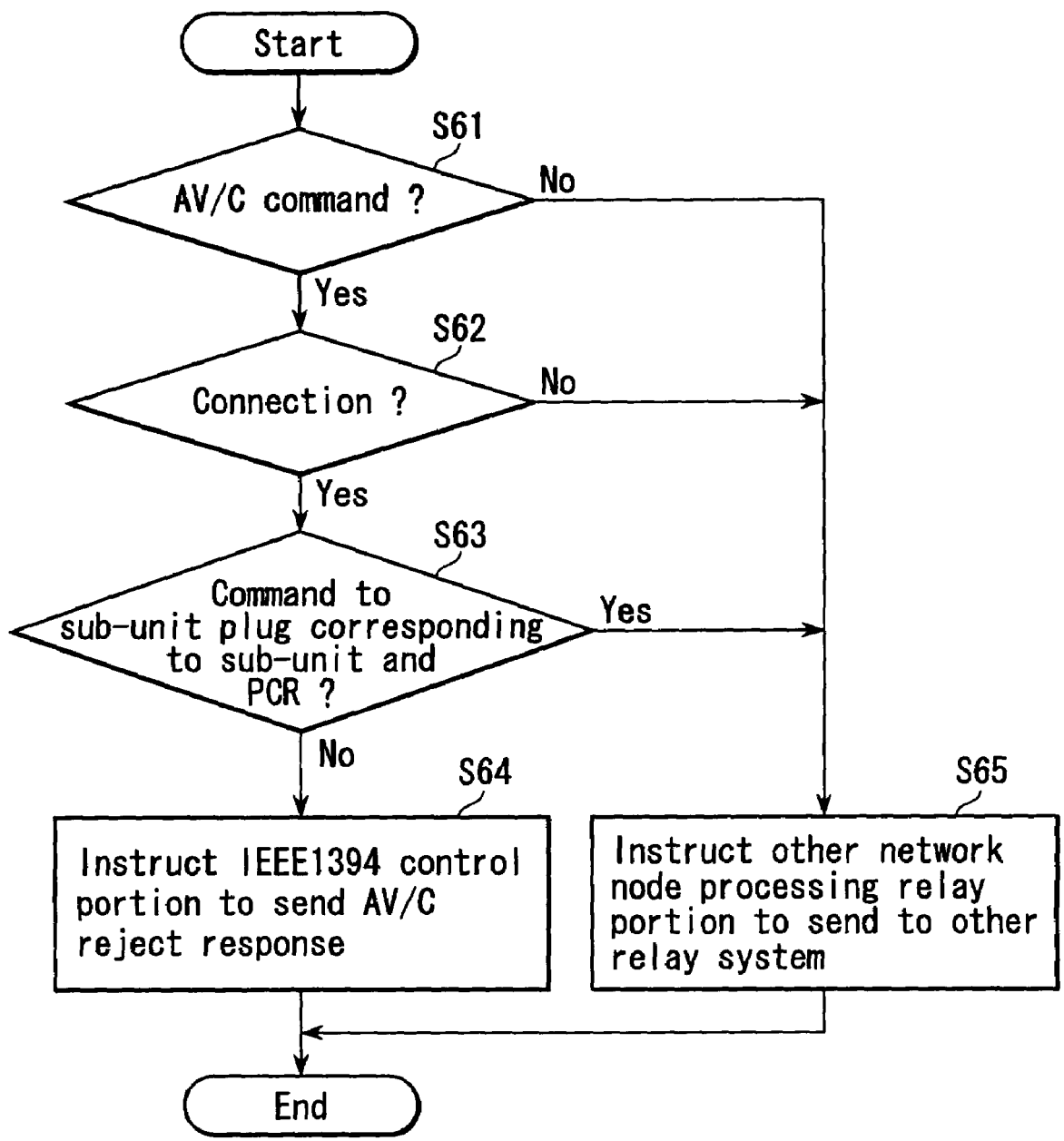
FIG. 11 is a flow chart for explaining an operation of a command judgment portion in the network relay apparatus of the present invention.
Figure 12:
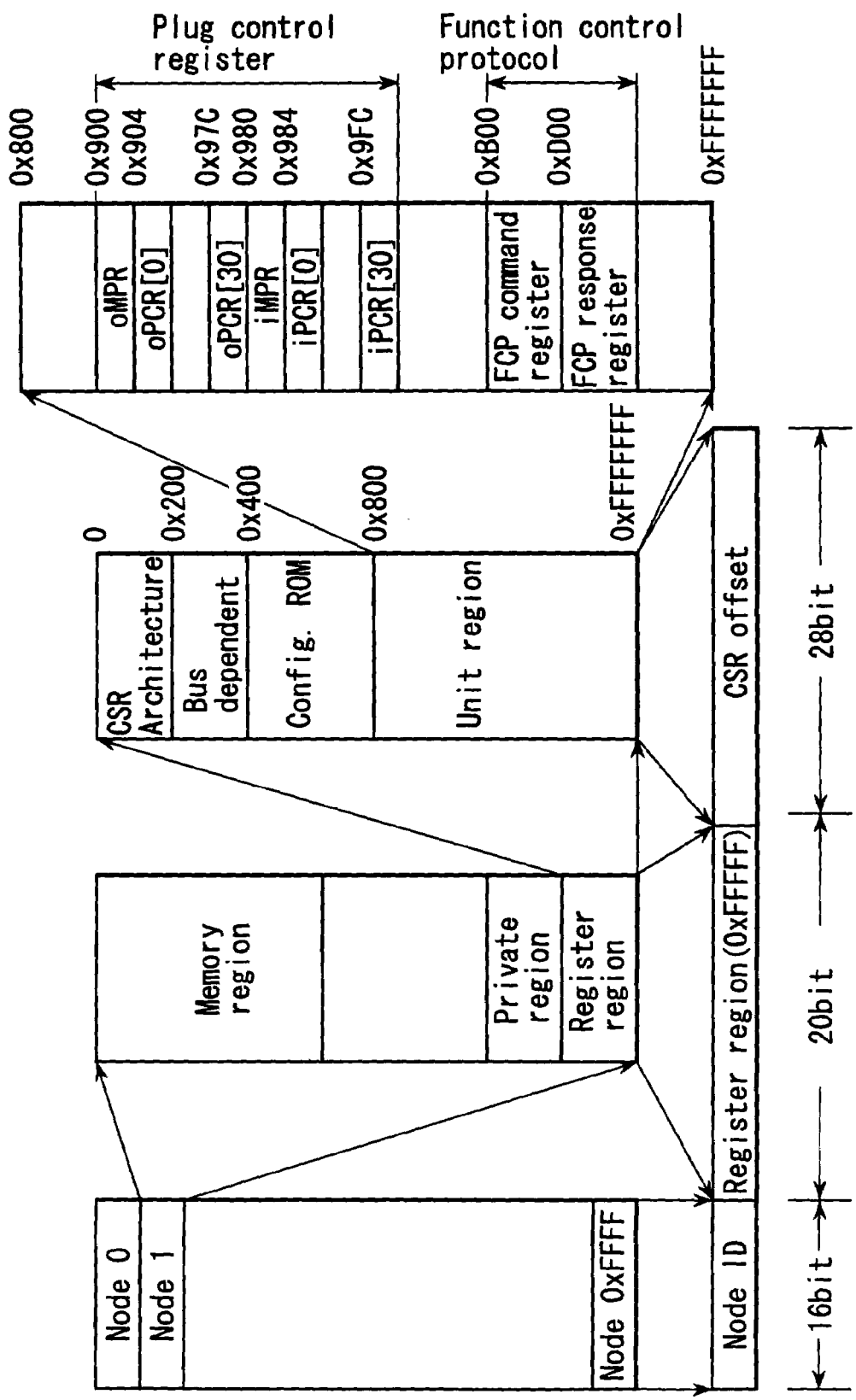
FIG. 12 is a diagram showing an architecture of IEEE1212CSR used by the network relay apparatus of the present invention.

The operation of the network relay apparatus having the above structure will be described in detail using flow charts. FIG. 3 is a conceptual diagram showing an example of virtual unit generated by the network relay apparatus of the present invention. FIG. 4 is a schematic diagram showing an example of status information. FIG. 5 is a diagram showing an example of judgment of a command judgment portion. FIG. 6 is a flow chart for explaining an operation of the self network node information collecting portion. FIG. 7 is a flow chart for explaining other operation of the self network node information collecting portion. FIG. 8 is a flow chart for explaining an operation of other network node information collecting portion. FIG. 9 is a flow chart for explaining an operation of virtual unit generating portion. FIG. 10 is a flow chart for explaining an operation of the virtual unit generating portion. FIG. 11 is a flow chart for explaining an operation of a command judgment portion. FIG. 12 is a diagram showing an architecture of IEEE1212CSR used by the network relay apparatus of the present invention.

(Outline of Operation of the Network Relay Apparatus)

The network relay apparatus of the present invention is provided in, for example, the IEEE1394 network and collects and stores information relating to other nodes from another network relay apparatus provided within the other IEEE1394 network through the communication channel N. Virtual unit information is generated based on this information and then, sub-unit information based on the IEEE1394 and plug control register PCR are generated. The plug control register stores output functional information indicating the function of signal output corresponding to unit information and input functional information indicating the function of signal input. FIG. 12 indicates a region of the plug control register within the IEEE1212CSR architecture as an example, which is provided in a unit region of the register region.

As a result, for example, if the network relay apparatus R2 in the network is monitored from a digital TV V5 within the IEEE1394 network n2 shown in FIG. 1, it is recognized that the network relay apparatus R2 has the function of respective apparatuses V1-V4 of the other network n1 as indicated in the conceptual diagram of FIG. 3.

That is, if the network relay apparatus R2 is accessed from the digital TV V5, the sub-unit 22 having an operation of the vender V1, which is D-VHS and plug control registers 22-1, 22-2 meaning its input/output are recognized. Likewise, functions 23-25 and I/O 23-1-25-3 of the vender V2 which is the D-VHS, the vender V3 which is the D-tuner, the vender V4 which is the AV-hard disc driver respectively of the other network n1 can be recognized.

If, for example, a recording command is supplied from the digital TV V5 to the VCR sub-unit 22 and the input terminal is specified to the plug control register 22-2, a recording instruction can be submitted to the vender V1 which is the D-VHS in the other network n1. What should be noted here is that all these monitor processings and instructions can be executed according to protocol to apparatuses (network relay apparatuses) in the IEEE1394 network.

In response to the command, the network relay apparatus R2 identifies and judges this command and transmits it to the vender V1 which is the D-VHS in the other network n1 so as to carry out recording processing. Therefore, the present invention succeeds in providing a network relay apparatus and network relay method capable of easily monitoring and controlling an apparatus existing on a different network as if it is an apparatus on the self network.

Next, processing of each section of the network relay apparatus R for achieving such an operation will be described in detail successively according to the flow charts shown in FIGS. 6-11.

(Collection of the Self Network Node Information Collecting Portion)

The self network node information collecting portion 2 collects information about a node on a local bus connected through the IEEE1394. Here, an operation of the self network node information collecting portion 2 will be described in detail with reference to the flow chart shown in FIG. 6.

First, the self network node information collecting portion 2 obtains the number of nodes on the local bus from the IEEE1394 control portion 10 (S1). Next, the self network node information collecting portion 2 selects a node on the local bus and instructs the IEEE1394 control portion 10 to issue a sub-unit information status command of the AV/C command to that node and acquires its sub-unit type and the quantity of each sub-unit type (S2). Next, information of serial bus plug is obtained. More specifically, an instruction for issuing a read transaction to oMPR (output Master Plug Register) and iMPR (input Master Plug Register) is submitted to the IEEE1394 control portion 10 and the quantity of possessed plug control register PCRs is acquired by reading them (S3). Finally, inherent information of each apparatus is acquired.

More specifically, the bus information block of the config ROM is instructed to issue a read transaction to the IEEE1394 control portion 10 so as to obtain a globally unique identifier GUID (S4). This information is memorized in the self network node information storage portion 3 (S5) and next, whether or not the processing from step S2 to step S5 is completed for all nodes is determined. If there is any node for which that processing is not completed, the processing is returned to step S2 and if that processing is completed for all the nodes, the processing is terminated (S6).

(Transmission of Self Network Node Information Collecting Portion)

On the other hand, the self network node information collecting portion 2 transmits information about nodes existing in the self network answering a node information acquisition request of other network relay apparatus. In a flow chart shown in FIG. 7, the self network node information collecting portion 2 receives a node information acquisition request from the other network relay apparatus from the radio communication control portion 12 (S11). Next, node information about a node existing in the self network stored in the self network node information storage portion 3 is fetched out (S12). Finally, that fetched out information is transmitted to the other network relay apparatus which requests that information through the radio communication control portion 12 (S13). In this way, if there is produced a request for information collection from a network relay apparatus provided on a mating network, the node information is transmitted in this procedure.

(Other Network Node Information Collecting Portion)

Next, processing of the other network node information collecting portion 4 will be described with reference to a flow chart shown in FIG. 8. The other network node information collecting portion 4 instructs the radio communication control portion 12 to supply node information which the other network relay apparatus controls in the self network node information storage portion (S21). Then, the other network relay apparatus receives node information of a local bus stored in the self network node information storage portion and acquires it (S22). Finally, the acquired node information is stored in the other network node information storage portion 5 (S23). Consequently, node information in the other network n1 can be obtained and used for virtual unit generation processing, which will be described later.

(Virtual Unit Generating Portion)

The virtual unit generating portion 7 has sub-units 22-25 and plug control register PCR corresponding to each unit existing in the other network n1 based on information stored in the other network node information storage portion 5. The respective sub-units 22-25 and plug control register PCR generates a virtual unit special for a unit in a corresponding different network. Processing of the virtual unit generating portion 7 will be described with reference to a flow chart of FIG. 9.

First, the virtual unit generating portion 7 initializes a variable for summing up the quantity of sub-units possessed in the virtual unit and the quantities of input plug control register PCRs and output plug control register PCRs to "0" (S31). Here, the types of the sub-units possessed by the virtual unit are classified into tuner, VCR and disc and then, their variables are set to max tuner ID, max VCRID and max disc ID respectively. Further, variables which express maximum quantities of the input plug control register PCRs and output plug control register PCRs are regarded as maxi PCRID and maxoPCRID. Next, information of a node existing in other network stored in the other network node information storage portion 5 is read out (S32). After that, a sub-unit is selected from the other network node (S33). Processing is branched depending on the type of a selected sub-unit (S35).

If the sub-unit type is tuner, the value of max tuner ID is allocated as ID of that sub-unit (S36) and then, "1" is added to the max tuner ID (S37). If the sub-unit type is VCR, the value of max VCRID is allocated as ID of that sub-unit (S38) and "1" is added to the max VCRID (S39). If the sub-unit type is disc, the value of max disc ID is allocated to that sub-unit (S40) and "1" is added to the max disc ID (S41).

If the allocation of ID to the sub-unit is terminated in step S35 to step S41, whether or not processing from step S34 to step S41 is completed for all sub-units of that node is determined and if all the processing is not completed, the processing is branched to step S34 (S42).

Next, an input plug control register PCR(iPCR) possessed by that node is selected (S43), the value of maxiPCRID is allocated to the plug control register PCR (S44) and "1" is added to the maxiPCRID (S45). After processing from step S43 to step S45 is completed, whether or not all input plug control register PCRs possessed by that node are selected is determined and then, if all of them are selected, the processing is branched to step S47 and otherwise, branched to step S43 (S46).

Next, an output plug control register PCR (oPCR) possessed by that node is selected (S47) and the value of maxoPCRID is allocated to the PCR (S48) and "1" is added to maxoPCRID (S49).

After processing from step S47 to step S49 is completed, whether or not the all output plug control register PCRs possessed by that node are selected is determined and if all of them are selected, the processing is branched to step S51 and otherwise, branched to step S47 (S50).

Next, whether processing from step S34 to step S50 is competed for all nodes is determined (S51) and if all of them is not completed, the processing is branched to step S33 and otherwise, branched to step S52. Next, by making a correspondence between the ID allocated to the sub-unit and plug control register PCR possessed by each node generated in step S32 to step S51 and the data of config ROM possessed by each node, status information is generated (S52). Finally, a representative sub-unit of a virtual unit is determined (S53) and then the processing is terminated.

As a node selection method in step S32, some methods are available. That is, the node may be selected in the order of the GUID from its smaller number or the node may be selected from the same vender apparatus as an apparatus connected to the self network through the GUID by using data stored in the self network node information storage portion 3. Further the node may be selected from nodes having for example a different kind of the sub-unit or a same kind of the sub-unit depending on the type of the sub-unit possessed by an apparatus connected to the self network. Further the node may be selected from an apparatus directly connected to the network relay apparatus based on topology information collected by the other network relay apparatus. As for a selection method of a representative sub-unit in step S53, for example it is permissible to select a sub-unit contained in a node having the smallest GUID or it is permissible to select a sub-unit possessed by the same vender apparatus as an apparatus connected to the self network through the GUID by using data stored in the self network node information storage portion 3. Further, depending upon the type of a sub-unit possessed by an apparatus connected to the self network, it is permissible to select a sub-unit possessed by for example a node having a different type of the sub-unit or it is permissible to select a sub-unit possessed by a node having the same sub-unit. Further, it is permissible to select a sub-unit directly connected to the network relay apparatus based on topology information collected by the other network relay apparatus.

FIG. 3 is a conceptual diagram of a virtual unit generated by the virtual unit generating portion 7. FIG. 3 shows an example of the virtual unit generated by the virtual unit generating portion 7 within the network relay apparatus R2. The network relay apparatus 1 acquires sub-unit information of each of the AV apparatus constituting the IEEE1394 network n1, the D-VHS vender V1, the D-VHS vender V2, the D-tuner vender V3, and the AV-HDD vender V4 and information of the plug control register PCR and the collected information is stored in the other network node information storage portion 5 of the network relay portion 1 of the network relay apparatus R2.

Based on this stored information, the virtual unit generating portion 7 in the network relay apparatus R2 generates a virtual unit having a sub-unit and plug control register PCR possessed by each of the D-VHS vender, D-VHS vender, D-tuner vender and AV-HDD vender. Further, this virtual unit possesses a vender sub-unit having status descriptor describing information of each config ROM of the D-VHS vender V1, D-VHS vender V2, D-tuner vender V3 and AV-HDD vender V4 and information of the sub-unit and plug control register PCR in a corresponding virtual unit.

FIG. 4 shows an example of the content described in the above-mentioned status information. In the example of FIG. 4, the content of the config ROM acquired by the self network node information collecting portion 2 of other network relay apparatus for each apparatus includes GUID and model name. The status information possessed by this vender sub-unit can be read out by each AV apparatus in the IEEE1394 network 2 by using open descriptor and read descriptor, which are AV/C commands.

(Command Judgment Portion)

The command judgment portion 6 judges which an AV/C command onto the virtual unit requested by other node on a local bus or read or lock processing request onto the plug control register PCR should be processed in a self node or be requested to other network relay apparatus. If it is intended to make such a processing request to the other network relay apparatus, a request for requesting other network to carry out that processing is issued to the other network node processing relay portion 8.

Processing of the command judgment portion 6 will be described with reference to a flow chart shown in FIG. 11. First, the command judgment portion 6 judges which a processing request to a virtual unit generated by the virtual unit generating portion 7 from the IEEE1394 control portion 10 is an AV/C command or a request to the plug controller register PCR and if this is an AV/C command, the processing is branched to step S62 and otherwise, branched to step S65 (S61). If it is judged that it is AV/C command in step S61, for example, whether or not it is an AV/C connecting command is judged. If it is the AV/C connecting command, the processing is branched to step S63 and otherwise, branched to step S65 (S62). In step S63, whether or not the AV/C connecting command is a command for a combination of a virtual sub-unit special for a unit existing on other network generated in the virtual unit generating portion 7 and a virtual plug control register PCR is judged (S63) and if so, the processing is branched to step S65. Otherwise, an instruction is given to the IEEE1394 control portion 10 to transmit the AV/C rejection response (S64) and the processing is terminated.

In step S65, a processing request for the virtual sub-unit is transmitted to the other network node processing relay portion 8 together with GUID which is information for specifying an apparatus corresponding to the virtual sub-unit in order to request that processing to the other network relay apparatus and then the processing is terminated.

An example of judgment of the command judgment portion 6 about judging whether or not a processing is to be executed in its self node will be described with reference to FIG. 5. A processing request on the AV/C command is judged by judging to what sub-unit that request is made or what kind of the command is submitted. For example, if UNIT INFO, SUBUNIT INFO CONNECT, which are a command to a unit is submitted, it is judged that a response is made in the self node. In case where an AV/C command to a vender sub-unit is submitted, it is judged that a response is made in the self node. On the other hand, if a read or lock request to the plug control register PCR is submitted, a request on oMPR(offset 0xF0000900) and iMPR (offset 0xF0000980) is processed in the self node and a response is sent to its requesting node. Further, as for the connecting command in the AV/C commands, in case of connecting a sub-unit for the virtual unit with the plug control register PCR, a response is made in the self node except about a combination special for each node in other network.

For example, an example of a case where a connecting command from other node to the virtual unit shown in FIG. 5 is received will be described. To a connecting command for connecting oPCR[0] with VCR sub-unit [0] in FIG. 5, a processing request is issued to other network relay apparatus. On the other hand, to a connecting command for connecting oPCR[1] with the tuner unit[0], a rejection response meaning a rejection is sent back through the self node because the oPCR [1] is not special for the tuner unit [0].

If there is a command from other node in a local bus to the virtual unit, whose processing needs to be requested to other network relay apparatus by the command judgment portion 6, the other network node processing relay portion 8 requests the other network relay apparatus which controls that node with reference to information in the other network node information storage portion 5 to issue that command to an actual apparatus. If a response is received from the network relay apparatus which makes the request, that response is accepted as a response to a node in the self network. If an access from other node in the local bus to the plug control register PCR other than the MPR occurs, a request for issuing an access to a plug control register PCR possessed by an actual apparatus is submitted to the other network relay apparatus which controls that node with reference to information in the other network node information storage portion. If a response returns from other network relay apparatus, it is accepted as a response to a node within the self network.

Answering a request from other network relay apparatus, the self network node processing relay portion 9 issues a read or lock request to a corresponding AV/C command or plug control register PCR from its other network node processing relay portion in the self network to an actual node existing in the local bus and its result is returned to a network relay apparatus which makes that request.

Due to an operation of each unit described in detail, the AV/C command to each sub-unit in the virtual unit and an access to the specialized plug control register PCR are made to correspond to other apparatuses V1-V4 on a different network n1 by the network relay apparatus of the present invention. Thus, if user accesses and instructs a network relay apparatus existing on his own network, he can monitor the status of an apparatus existing on other network. Consequently, a method of appealing the function of the network relay apparatus makes it easy to make a recording unit existing on other network, for example, record an image.

Further, because information about a node described in config ROM of an apparatus connected to a different network can be obtained by disclosing a special status descriptor within the virtual unit, the model name of an apparatus connected to other network can be obtained.

Although in the above embodiment, a case where its network is IEEE1394 has been described, the present invention can be applied to other AV apparatus network.

Although those skilled in art can execute the present invention through various types of embodiments described above, they can imagine other various modifications easily and even those having an inventive capability can apply the present invention to various embodiments. Therefore, the present invention covers a wide range not departing from its disclosed principle and novel feature and is not restricted to the above-described embodiments.

As described above, the present invention provides a network relay apparatus and network relay method in which node information of a mating network is collected through network relay apparatuses provided within multiple networks respectively and virtual unit information is generated so as to access and instruct a network relay apparatus within its self network, thereby identifying the status of an apparatus on the mating network to allow that apparatus to execute any processing easily.

What is claimed is:

1. A network relay apparatus capable of being connected to a first network that performs communications based on a first protocol and further connected to a second network that performs communications based on a second protocol different from the first protocol, said apparatus comprising:

an information collecting portion configured to collect information regarding identification and functionality of at least one device having a signal processing capability and being associated with the second network;

a virtual unit generating portion configured to generate at least one virtual unit corresponding to the first protocol, based on the identification and functionality information collected about the at least one device, wherein information associated with the generated at least one virtual unit includes: information related to at least one sub-unit included in the generated virtual unit that corresponds to the at least one device; output function information indicating a function of a signal output corresponding to the at least one sub-unit; and input function information indicating a function of a signal input corresponding to the at least one sub-unit;

when a connecting command to the generated virtual unit is received from the first network, a judgment portion configured to determine, based on the information associated with the generated virtual unit, whether or not the connecting command instructs a connection to the at least one sub-unit that corresponds to the at least one device associated with the second network, and configured to reject the connecting command based on a negative determination; and a relay portion configured to receive the connecting command based on a positive determination in the judgment portion and transmit the connecting command to the at least one device associated with the second network.

2. The network relay apparatus according to claim 1, further comprising:

when a predetermined command is received via the first network, the judgment portion configured to judge whether or not the at least one device associated with the second network is capable of processing the predetermined command based on the information associated with the generated virtual unit;

the relay portion, if the judgment portion judges that the predetermined command is capable of being processed by the at least one device, transmits the predetermined command to the at least one device associated with the second network via a communication channel and the second network.

3. The network relay apparatus according to claim 1, wherein the information collecting portion collects information about the identification and functionality of the at least one device associated with second network by communicating with a new network relay apparatus provided on the second network.

4. The network relay apparatus according to claim 1, wherein the first protocol corresponds to IEEE1394 standard, the output function information corresponds to output plug control registers and the input function information corresponds to input plug control registers.

5. The network relay apparatus according to claim 1, wherein the second protocol is a radio LAN protocol for connecting at least the first network to the second network.

6. A network relay apparatus capable of being connected to a first network that performs communications based on a first protocol and further connected to a second network that performs communications based on a second protocol different from the first protocol, said apparatus comprising:

an information collecting portion configured to collect information regarding identification and functionality of at least one device having a signal processing capability and being associated with the second network; and a virtual unit generating portion configured to generate at least one virtual unit corresponding to the first protocol based on the identification and functionality information collected about the at least one device, wherein information associated with the generated virtual unit includes: information related to at least one sub-unit included in the generated virtual unit that corresponds to the at least one device; output function information indicating a function of a signal output corresponding to the at least one sub-unit; and input function information indicating a function of a signal input corresponding to the at least one sub-unit;

wherein, for a predetermined command received from the first network, it is determined at the network relay apparatus, whether or not the predetermined command is capable of being processed, based on the information associated with the generated virtual unit and the predetermined command is relayed via the network relay apparatus to the at least one device associated with the second network, based on a positive determination.

7. A relay method using a network relay apparatus capable of being connected to a first network that performs communications based on a first protocol and further connected to a second network that performs communications based on a second protocol different from the first protocol, said method comprising:

collecting information regarding identification and functionality of at least one device having a signal processing capability and being associated with the second network via a communication channel;

generating at least one virtual unit corresponding to the first protocol based on the collected identification and functionality information, wherein information associated with the generated virtual unit includes: information relating to at least one sub-unit included in the generated virtual unit that corresponds to the at least one device; output function information indicating the function of a signal output corresponding to the at least one sub-unit; and input function information indicating the function of a signal input corresponding to the at least one sub-unit; and when a connecting command to the generated virtual unit is received from a first network, judging, based on the information associated with the generated virtual unit, whether or not the connecting command instructs a connection to the at least one sub-unit that corresponds to the at least one device associated with the second network, and rejecting the connecting command based on a negative determination; and receiving the connecting command based on a positive determination during judging and transmitting the connecting command to the at least one device associated with the second network.

8. A relay method according to claim 7, further comprising:

when a predetermined command is received via the first network, judging whether or not the at least one device associated with the second network is capable of processing the predetermined command based on the information associated with the virtual unit;

transmitting the predetermined command to the at least one device via the communication channel and the second network, if the judgment portion judges that the command is capable of being processed by the at least one device.

9. The network relay method according to claim 7, wherein the information regarding the identification and functionality of the at least one device associated with the second network is collected by communication with a new network relay device provided on the second network.

10. The network relay method according to claim 7, wherein the first protocol corresponds to IEEE1394 standard, the output function information corresponds to output plug control registers and the input function information corresponds to input plug control registers.

11. The network relay method according to claim 7, wherein the second protocol is a radio LAN protocol for connecting at least the first network to the second network.

* * * * *